US008085127B2

(12) United States Patent
Nakano

(10) Patent No.: US 8,085,127 B2
(45) Date of Patent: Dec. 27, 2011

(54) REMOTE CONTROLLING APPARATUS AND REMOTE CONTROLLING METHOD

(75) Inventor: Masahiro Nakano, Tokyo (JP)

(73) Assignee: Sony Corporation, Tokyo (JP)

( * ) Notice: Subject to any disclaimer, the term of this patent is extended or adjusted under 35 U.S.C. 154(b) by 928 days.

(21) Appl. No.: 11/924,069

(22) Filed: Oct. 25, 2007

(65) Prior Publication Data

US 2008/0198034 A1 Aug. 21, 2008

(30) Foreign Application Priority Data

Nov. 24, 2006 (JP) ................................ 2006-316570

(51) Int. Cl.
*G05B 19/00* (2006.01)

(52) U.S. Cl. ...................... 340/5.61; 455/41.2; 455/41.1

(58) Field of Classification Search ............. 340/825.72, 340/825.22, 5.6, 5.61; 341/176; 370/338; 455/41.2, 41.1

See application file for complete search history.

(56) References Cited

U.S. PATENT DOCUMENTS 5,650,931 A * 7/1997 Nii ................................. 701/22
2005/0094610 A1* 5/2005 de Clerq et al. ............... 370/338

FOREIGN PATENT DOCUMENTS

JP 2004-144781 5/2001

* cited by examiner

*Primary Examiner* — Vernal Brown
(74) *Attorney, Agent, or Firm* — Oblon, Spivak, McClelland, Maier & Neustadt, L.L.P.

(57) ABSTRACT

A remote controlling apparatus for a remote controlling system of wireless communication type is disclosed. The remote controlling apparatus includes a broadcasting section, a receiving section, a detecting section, and a setting section. The broadcasting section broadcasts a predetermined signal in a lower transmission output state than in a regular communication state. The receiving section receives acknowledge and reception state electric field intensity information from at least one device under remote control. The detecting section detects a device under remote control having highest reception state electric field intensity as a nearest device. The setting section sets the nearest device as an object device under remote control.

8 Claims, 9 Drawing Sheets

Fig. 5

| DEVICE NAME | SIGNAL INTENSITY |
|---|---|
| KDL46X | 1 |
| RDZ9000 | 2 |
| TADA9100 | 3 |
| DVPN9100 | 4 |

REMOTE CONTROLLING APPARATUS AND REMOTE CONTROLLING METHOD

CROSS REFERENCES TO RELATED APPLICATIONS

The present invention contains subject matter related to Japanese Patent Application JP 2006-316570 filed in the Japanese Patent Office on Nov. 24, 2006, the entire contents of which being incorporated herein by reference.

BACKGROUND OF THE INVENTION

1. Field of the Invention

The present invention relates to a remote controlling apparatus and a remote controlling method applied for remotely controlling an electronic device for example according to a wireless communication system.

2. Description of the Related Art

When a home-use device, for example, a television receiver, is remotely controlled using a wireless communication of a 2.4 GHz band ISM (Industrial, Scientific and Medical use), the device is less affected by obstructions and the communication distance becomes longer than using an infrared system. In such a remote controlling system, when a television receiver is newly bought and installed, it is necessary to associate a remote controlling device (hereinafter referred to as a remote commander) with the television receiver in a relationship of 1:1 (this operation is referred to as pairing) to allow the remote commander to control the television receiver. In particular, when a remote controlling system has had another device under control (composed of a communication section and an electronic device), it is necessary for the user to set his or her desired electronic device for a control object.

As a method of searching for a communicable device based on the Bluetooth, HomeRF, or the like, a master station transmits a slave station detection message as a broadcast message to a slave station. When a slave station has received the slave station detection message, the slave station transmits a response message to the master station. By receiving the response message, the master station can search for a communicable device. In this case, since the master station transmits the slave station detection message to all devices in the search range, the master station inevitably receives response messages from non-objective devices. To solve such a problem, a technique of which a slave station is detected by changing the communication range of the slave station detection message has been disclosed in Japanese Patent Application Laid-Open No. 2001-144781 (hereinafter referred to as Patent Document 1).

SUMMARY OF THE INVENTION

In the method of the related art, the communication range of the slave station detection message is narrowed and a slave station is detected as a communication object in the narrowed communication range. In this method, it is not applicable to a remote controlling system of which one desired electronic device is set for a control object of a plurality of electronic devices.

In view of the foregoing, it would be desirable to provide a remote controlling system, a remote controlling apparatus, and a remote controlling method that allow a desired one of a plurality of electronic devices to be set for a control object.

According to an embodiment of the present invention, there is provided a remote controlling apparatus for a remote controlling system of wireless communication type. The remote controlling apparatus includes a broadcasting section, a receiving section, a detecting section, and a setting section. The broadcasting section broadcasts a predetermined signal in a lower transmission output state than in a regular communication state. The receiving section receives acknowledge and reception state electric field intensity information from at least one device under remote control. The detecting section detects a device under remote control having highest reception state electric field intensity as a nearest device. The setting section sets the nearest device as an object device under remote control.

According to an embodiment of the present invention, there is provided a remote controlling apparatus for a remote controlling system of wireless communication type. The remote controlling apparatus includes a broadcasting section, a broadcasting section, a first command transmitting section, and a second command transmitting section. The broadcasting section broadcasts a predetermined signal in a lower transmission output state than in a regular communication state. The receiving section receives acknowledge from at least one device under remote control. The first command transmitting section transmits a predetermined command to each of the devices under remote control from which the remote controlling apparatus has received the acknowledge, causes each of the devices under remote control to become a command acceptable state for a predetermined period of time, and causes a user to know the command acceptable state of each of the devices under remote control. The second command transmitting section transmits a command to a desired one of the devices under remote control for the predetermined period of time.

According to an embodiment of the present invention, there is provided a remote controlling method for a remote controlling system of wireless communication type. A predetermined signal is broadcast in a lower transmission output state than in a regular communication state. Acknowledge and reception state electric field intensity information are received from at least one device under remote control. A device under remote control having highest reception state electric field intensity is detected as a nearest device. The nearest device is set as an object device under remote control.

According to an embodiment of the present invention, there is provided a remote controlling method for a remote controlling system of wireless communication type. A predetermined signal is broadcast in a lower transmission output state than in a regular communication state. Acknowledge is received from at least one device under remote control. A predetermined command is transmitted to each of the devices under remote control from which the remote controlling apparatus has received the acknowledge. Each of the devices under remote control is caused to become a command acceptable state for a predetermined period of time. A user is caused to know the command acceptable state of each of the devices under remote control. A command is transmitted to a desired one of the devices under remote control for the predetermined period of time.

According to an embodiment, one device under remote control that is the nearest to the remote controlling apparatus in the plurality of devices under remote control can be set for a remote control object. In addition, according to an embodiment of the present invention, when there are a plurality of devices under remote control that have the same distance to the remote controlling apparatus, they can be set for control objects. Substantially, only a desired device under remote control can be controlled.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 5 is a schematic diagram showing an exemplary display screen according to the embodiment of the present invention;

DETAILED DESCRIPTION OF THE PREFERRED EMBODIMENTS

Next, with reference to the accompanying drawings, embodiments of the present invention will be described. An embodiment of the present invention is applied for a remote controlling system that remotely controls a home-use electronic device. The remote controlling system is composed of one remote controlling apparatus and at least one device under remote control. As described above, the remote controlling apparatus is referred to as a remote commander. The remote controlling apparatus transmits remote control data (hereinafter referred to as a command) corresponding to a user's operation. The device under remote control is composed of a communication section and an electronic device. The device under remote control receives a command from the remote commander and performs an operation according to the received command.

Examples of the electronic device include AV devices (such as a video recording/reproducing device, an audio recording/reproducing device, and a television receiver) and home-use electric appliances (such as a refrigerator). The remote controlling apparatus is driven for example by a built-in power supply. The device under remote control is driven for example by a commercial power supply.

The remote controlling apparatus and the device under remote control each are provided with a transmitter and a receiver such that they bidirectionally communicate with each other. They can use for example the physical layer of IEEE (Institute of Electrical and Electronics Engineers) 802.15.4 as a wireless communication system. The IEEE 802.15.4 is the name of a short distance wireless network standard called PAN (Personal Area Network) or W (Wireless) PAN.

The communication rate of this standard is in the range from several 10 kbps to several 100 kbps. The communication range is from several 10 m to several 100 m. The communication is made in frames. One frame has a size of a maximum of 133 bytes of a payload (0 to 127 bytes) and a header (6 bytes). In this communication system, a plurality of transmission and reception methods may be used. However, in the remote controlling system according to this embodiment, the simplest method, namely a method of which the remote controlling apparatus transmits a command to the device under remote control and receives acknowledge ACK therefrom, is used. Instead, more complicated transmission and reception methods may be used. According to another embodiment of the present invention, another bidirectional wireless communication system other than the foregoing wireless communication system may be used.

Figure 1:
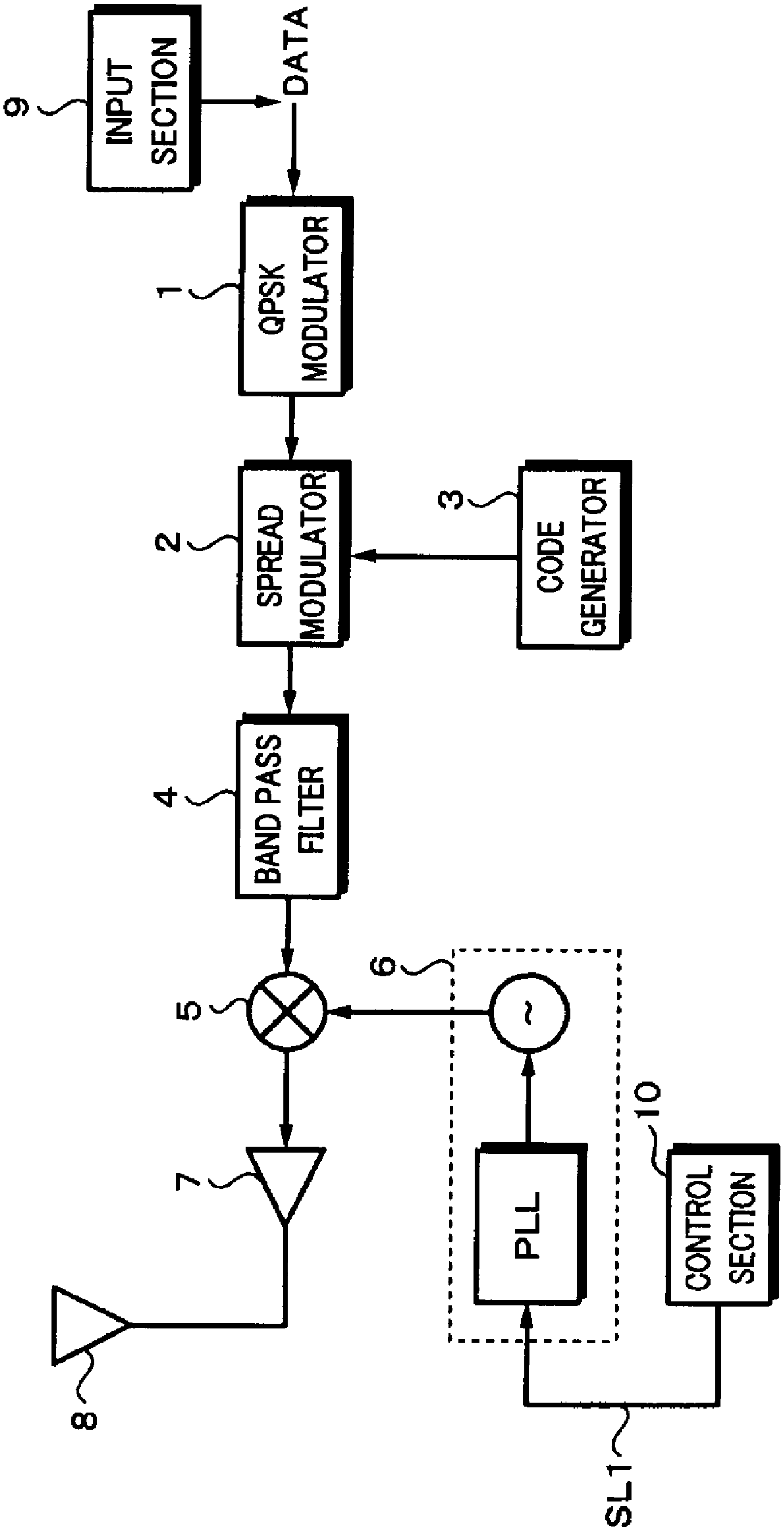
FIG. 1 is a block diagram showing a structure of a transmission side of a communicating apparatus according to an embodiment of the present invention.

FIG. 1 shows a structure of the transmitter. Transmission data are supplied to a QPSK (Quadrature Phase Shift Keying) modulator 1. The QPSK modulator 1 modulates the transmission data according to the QPSK system. An output signal of the QPSK modulator 1 is supplied to a spread modulator 2. A spread code generated by a code generator 3 is supplied to the spread modulator 2. The spread modulator 2 spreads the output signal of the QPSK modulator 1 with the spread code according to the DSSS (Direct Sequence Spread Spectrum) system. As the spread code, a pseudo noise sequence is used. The DS (Direct Spread) system is an SS (Spectrum Spread) system that phase-modulates a signal with a high-speed spread code and spreads the spectrum of the signal.

An output signal of the spread modulator 2 is supplied to a multiplexing device 5 through a band pass filter 4. A PLL-structured local oscillator 6 supplies a local oscillation signal to the multiplexing device 5. The multiplexing device 5 generates a transmission signal that has been up-converted into a 2.4 GHz frequency band. The transmission signal is supplied to an antenna 8 through an amplifier 7 and transmitted from the antenna 8. When the gain of the amplifier 7 is controlled, the transmission output can be varied.

Sixteen channels of 2.405 GHz, 2.410 GHz, 2.415 GHz, . . . , and 2.480 GHz at intervals of 5 MHz are set for communication channels. In this embodiment, a plurality of frequency channels, for example three frequency channels, of the 16 frequency channels that do not overlap with those used for a wireless LAN are used. The local oscillation frequency that is output from the local oscillator 6 is set with a channel selection signal SL1. The selection signal SL1 is output from a control section 10.

The control section 10 is a microcomputer composed of for example a CPU (Central Processing Unit), a ROM (Read Only Memory), a RAM (Random Access Memory), and so forth. By executing a program stored in the ROM or the like, the control section 10 totally controls each section of the transmitter.

The transmitter of the remote controlling apparatus has an input section 10 that includes, for example, keys, switches, buttons, a touch panel, and so forth used to remotely control the device under remote control. The remote controlling apparatus transmits a command corresponding to an operation of the input section 10 to the device under remote control. When the device under remote control has correctly received a command, the device under remote control transmits acknowledge ACK as a response message to the remote controlling apparatus.

Figure 2:
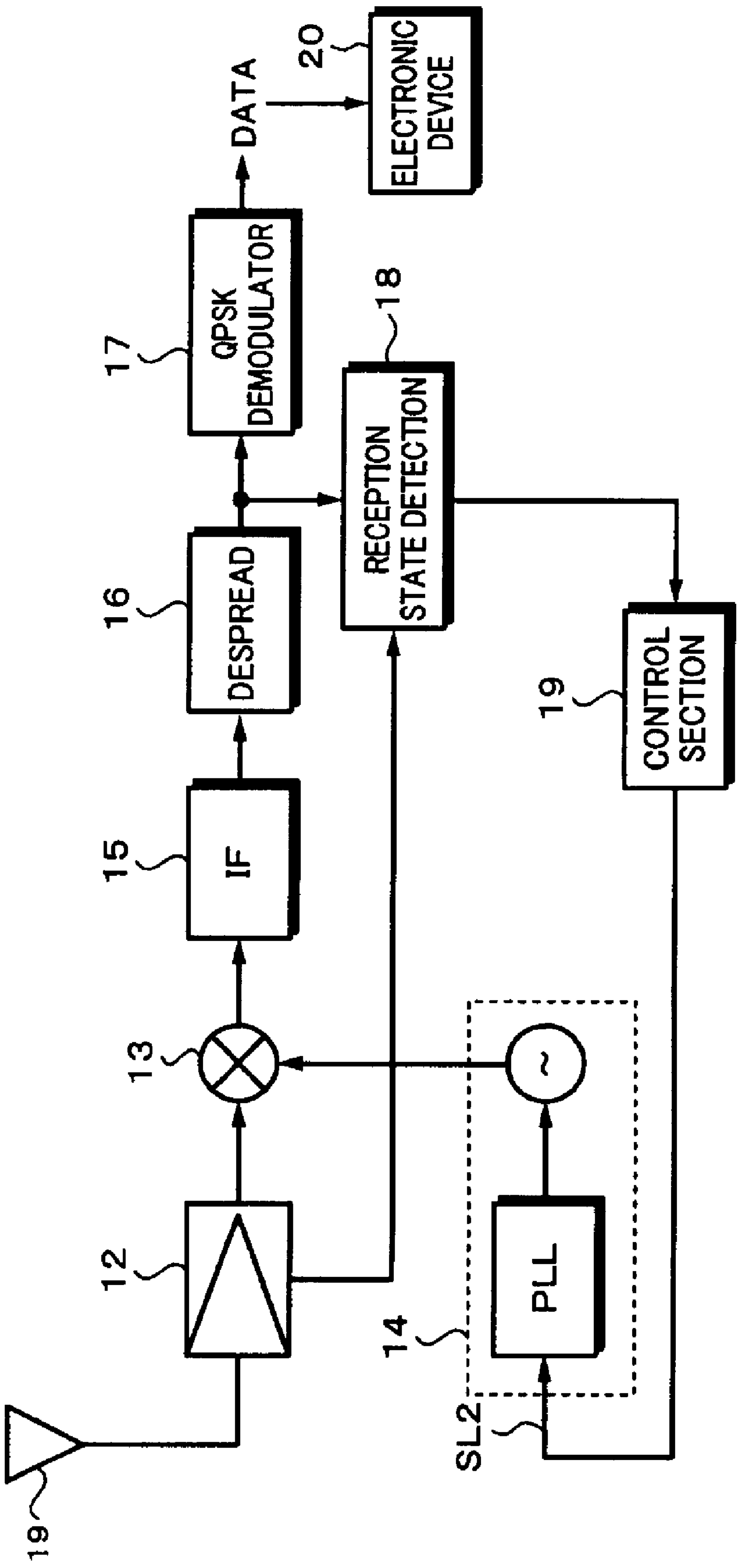
FIG. 2 is a block diagram showing a structure of a reception side of the communicating apparatus according to the embodiment of the present invention.

FIG. 2 shows a structure of the receiver. In the receiver, a signal received from an antenna 11 is supplied to an LNA (Low Noise Amplifier) 12. The antenna 11 is generally shared by the antenna 8 of the transmitter. The antenna 11 of the receiver or the antenna 8 of the transmitter is selected by a transmission/reception switch. An output signal of the LNA 12 is supplied to a multiplying device 13. A PLL-structured local oscillator 14 supplies a local oscillation signal to the multiplying device 13. The multiplying device 13 generates a down-converted IF (Intermediate Frequency) signal.

The IF signal is supplied to a despread section (spread demodulation section) 16 through an intermediate frequency amplifier 15. By correlating the reception signal and a reference spread code generated on the reception side, the despread section 16 demodulates the signal. Unless timing of the reception signal matches timing of the reference spread code, the despread section 16 is unable to obtain a correct correlation value. When the transmission side and the reception side start communication, the reception side detects timing and stores the detected timing. To detect timing, a correlating device such as a matched filter is used.

A demodulation signal of the despread section 16 is supplied to a QPSK demodulator 17. The QPSK demodulator 17 demodulates the signal according to the QPSK demodulation method. The QPSK demodulator 17 outputs reception data. In the device under remote control, the reception data are commands that are used to control an electronic device 20. In the remote controlling apparatus, the reception data are acknowledge ACK that is supplied to a control section 19.

The control section 19 is a microcomputer composed of for example a CPU (Central Processing Unit), a ROM (Read Only Memory), a RAM, and so forth. By executing a program stored in the ROM or the like, the control section 19 totally controls each section of the receiver. In reality, the structure of the control section 10 of the transmitter is in common with the structure of the control section 19 of the receiver.

A demodulation signal outputted from the despread section 16 and an output signal outputted from the LNA 12 are supplied to a reception state detection section 18. When receiving a frame, the reception state detection section 18 calculates a link quality indicator (LQI) based on the intensity of the signal and the intensity of noise interference and informs a higher portion on the physical layer of the calculated result. The LQI is defined on the physical layer of the IEEE 802.15.4 and is represented as a value of digital data. The LQI is supplied to the control section 19. As will be described later, the LQI that the reception state detection section 18 of the receiver of the device under remote control has calculated is transmitted to the remote controlling apparatus along with acknowledge ACK.

The local oscillator 14 is controlled with a channel selection signal SL2 that the control section 19 generates such that a predetermined frequency channel that is less affected by interference waves of for example a microwave oven is selected from the plurality of frequency channels.

Figure 3:
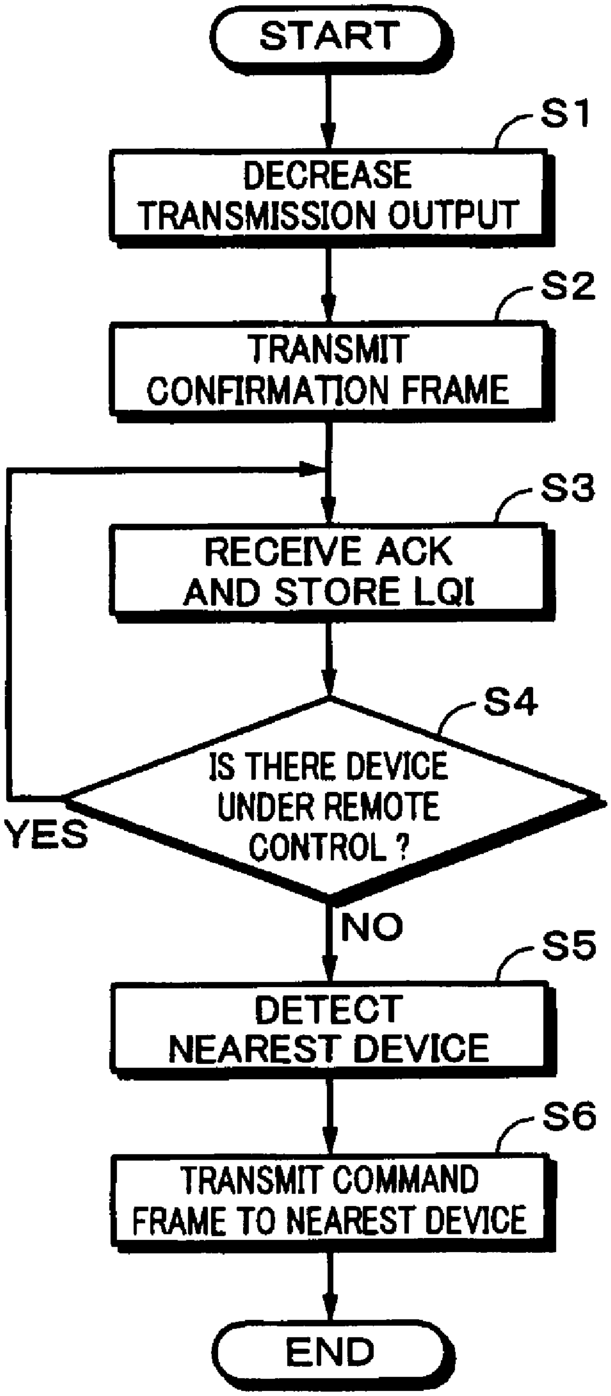
FIG. 3 is a flow chart showing a process according to the embodiment of the present invention.

Next, this embodiment will be described. FIG. 3 shows a flow of a process that the control section of the remote controlling apparatus performs. First, the remote controlling apparatus is approached to the device under remote control that has been set for a control object. At step S1, the gain of the amplifier 7 is decreased. As a result, the transmission output of the remote controlling apparatus has become lower than that in its regular communication state. In the regular communication state, the communication range of the remote controlling apparatus is around 10 m. In the decreased gain state, the communication range of the remote controlling apparatus is around 1 m or less (around several 10 cm).

At step S2, the remote controlling apparatus transmits a confirmation frame. The remote controlling apparatus broadcasts the confirmation frame in such a manner that the remote controlling apparatus does not specify its recipient. The remote controlling apparatus automatically transmits the confirmation frame before issuing a command such as a reproduction command. Instead, the remote controlling apparatus transmits the confirmation frame corresponding to a predetermined key or button operation. Devices under remote control that exist in the communication range receive the confirmation frame and transmit acknowledge ACK to the remote controlling apparatus. In this case, the devices under remote control transmit LQI that represents the reception intensity of the confirmation frame along with acknowledge ACK to the remote controlling apparatus. At step S3, the remote controlling apparatus receives acknowledge ACK and stores data of the received LQI to the memory of the control section.

It is likely that a plurality of devices under remote control exist in the communication range. Thus, at step S4, the remote controlling apparatus determines whether or not it has completed a process for the plurality of devices under remote control. After the remote controlling apparatus has completed the process for all the devices under remote control at step S3 (namely, the remote controlling apparatus has received acknowledge ACK and stored LQI for each of the devices under remote control), the flow advances to step S5.

At step S5, with reference to the values of LQI stored in the memory, the remote controlling apparatus detects a device under remote control having the largest value of LQI as the nearest device under remote control (referred to as the nearest device). As a result, the remote controlling apparatus and the nearest device can communicate with each other in a relationship of 1:1. When devices under remote control each have been assigned a unique ID such as a MAC address, since such an ID has been added to the received acknowledge ACK, the remote controlling apparatus can know the ID of the nearest device. As the recipient of a command that the remote controlling apparatus transmits, the ID of the nearest device is added to acknowledge ACK. When a device under remote control does not have a unique ID, an ID is assigned to a device under remote control from which acknowledge ACK has been received such that the device under remote control can be identified by the assigned ID.

It should be noted that the number of devices under remote control that the remote controlling apparatus can control is not limited to one. As described above, IDs corresponding to the detected devices under remote control are stored for example in a nonvolatile memory of the remote controlling apparatus. By operating the input section of the remote controlling apparatus, the user can select a device under remote control as a control object from those.

When the remote controlling apparatus has detected the nearest device at step S5, the flow advances to step S6. At step S6, the remote controlling apparatus transmits a command to the nearest device to remotely control it, namely to cause the device under remote control to perform a predetermined operation. The remote controlling apparatus receives acknowledge ACK corresponding to the transmitted command from the device under remote control (this step is not shown). When the remote controlling apparatus is not able to receive acknowledge ACK, the remote controlling apparatus performs a retransmitting process or an error handling process.

Figure 4A:
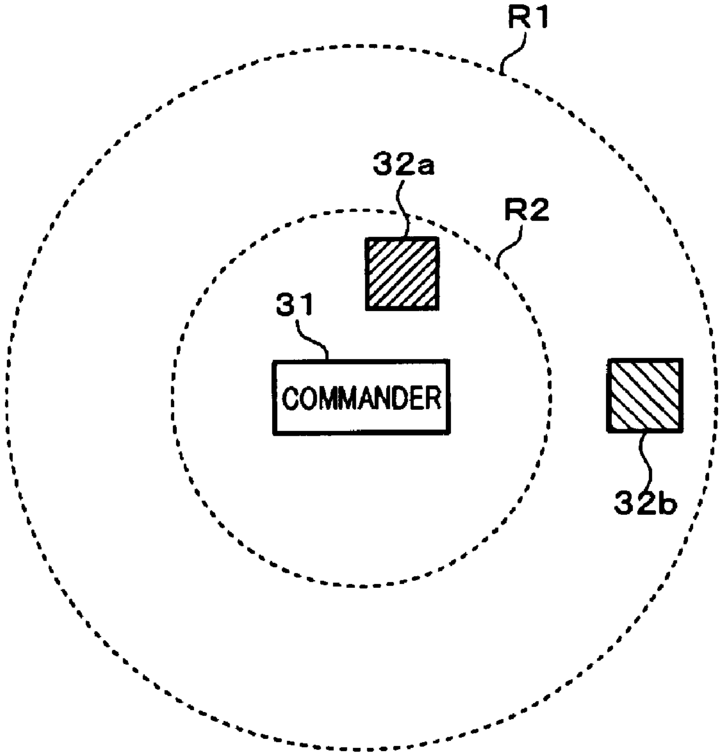
FIG. 4A and FIG. 4B are schematic diagrams describing the embodiment of the present invention.

According to this embodiment of the present invention, as shown in FIG. 4A, when the transmission output of the remote controlling apparatus is decreased, regular communication range R1 of the remote controlling apparatus (referred to as the commander in FIG. 4A) is changed to communication range R2 that is narrower than communication range R1. Thus, among a plurality of devices under remote control (hatched blocks) 32*a* and 32*b*, the device under remote control 32*a* that exists in communication range R2 is detected as the nearest device.

Figure 4B:
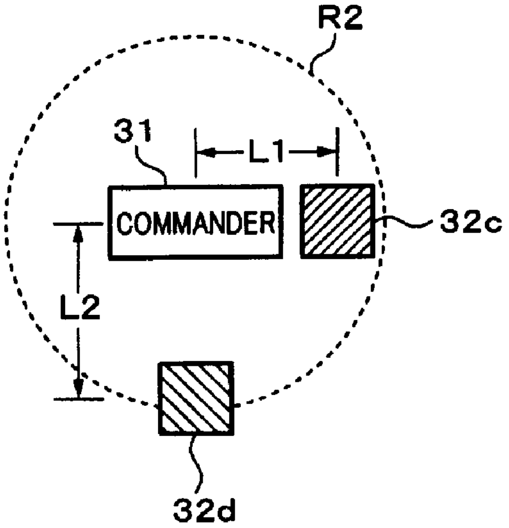

A plurality of AV (Audio Visual) devices may be disposed in one rack, as shown in FIG. 4B, when the communication output is decreased, it is likely that a plurality of devices under remote control 32*c* and 32*d* may exist in communication range R2. In this case, when the device under remote control 32*c* and 32*d* are apart from the remote controlling apparatus 31 by distance L1 and distance L2 (where L1 is smaller than L2), respectively, the device under remote control 32*c* is detected as the nearest device. Even if it is difficult to identify a device under remote control as a control object only by decreasing the transmission output, the nearest device can be detected based on the value of the reception electric field intensity. As a result, a desired device can be set for a control object.

The remote controlling apparatus is preferably provided with a display screen using an LCD (Liquid Crystal Display) or the like. As shown in FIG. 5, when the remote controlling apparatus has stored LQI (at step S3 shown in FIG. 3), the display screen displays device names and their signal intensities. The user can check whether or not his or her desired electronic device has been set for a control object with reference to the device names and their signal intensities displayed on the display screen. FIG. 5 is an exemplary display screen that may display the IDs of devices or signal intensities as a graph.

Figure 6:
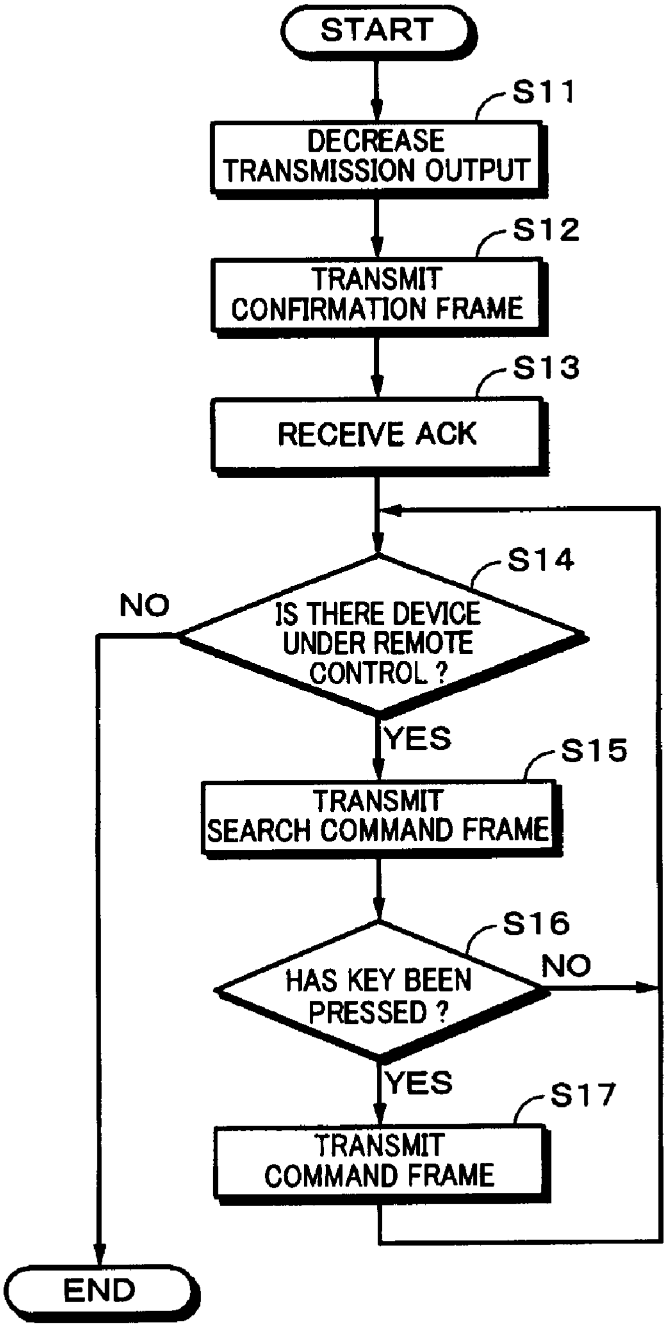
FIG. 6 is a flow chart showing a process of a remote controlling apparatus according to another embodiment of the present invention.

Next, another embodiment of the present invention will be described. In this embodiment, the structure of a transmitter and a receiver of this embodiment are the same as those of the foregoing embodiment. FIG. 6 shows a flow of a process that a control section of a remote controlling apparatus of this embodiment performs. The remote controlling apparatus is approached to a device under remote control to be set for a control object although this operation may not be necessary. At step S11, the gain of an amplifier 7 is decreased. As a result, the transmission output of the remote controlling apparatus has become lower than that in its regular communication state. In the regular communication state, the communication range of the remote controlling apparatus is around 10 m. In the decreased gain state, the communication range of the remote controlling apparatus is around 1 m or less (around several 10 cm).

At step S12, the remote controlling apparatus transmits a confirmation frame. The remote controlling apparatus broadcasts the confirmation frame in such a manner that the remote controlling apparatus does not specify its recipient. The remote controlling apparatus automatically transmits the confirmation frame before issuing a command such as a reproduction command. Instead, the remote controlling apparatus transmits the confirmation frame corresponding to a predetermined key or button operation. Devices under remote control that exist in the communication range receive the confirmation frame and transmit acknowledge ACK to the remote controlling apparatus.

At step S13, the remote controlling apparatus receives acknowledge ACK. The remote controlling apparatus detects that there are a plurality of devices under remote control in the narrowed communication range corresponding to the decreased transmission output. Like the foregoing embodiment, the remote controlling apparatus can identify each of devices under remote control by a unique ID (for example, MAC address) or a temporary added ID. As a result, the remote controlling apparatus and the desired device under remote control can communicate with each other in a relationship of 1:1.

At step S13, the remote controlling apparatus may have not received acknowledge ACK. At step S14, the remote controlling apparatus determines whether or not there are devices under remote control depending on whether or not the remote controlling apparatus has received acknowledge ACK. When the remote controlling apparatus has determined that there is no device under remote control, the remote controlling apparatus completes the process. When the determined result at step S14 denotes that there is a device under remote control, the flow advances to step S15. At step S15, the remote controlling apparatus transmits a search command frame. The remote controlling apparatus broadcasts or successively transmits the search command frame to each device under remote control. The remote controlling apparatus broadcasts or transmits the search command frame to each device under remote control automatically or according to a user's predetermined key operation. The user's predetermined key operation is performed for example by momentarily pressing the power button. As a result, the remote controlling apparatus transmits the search command frame to one device under remote control.

Figure 7:
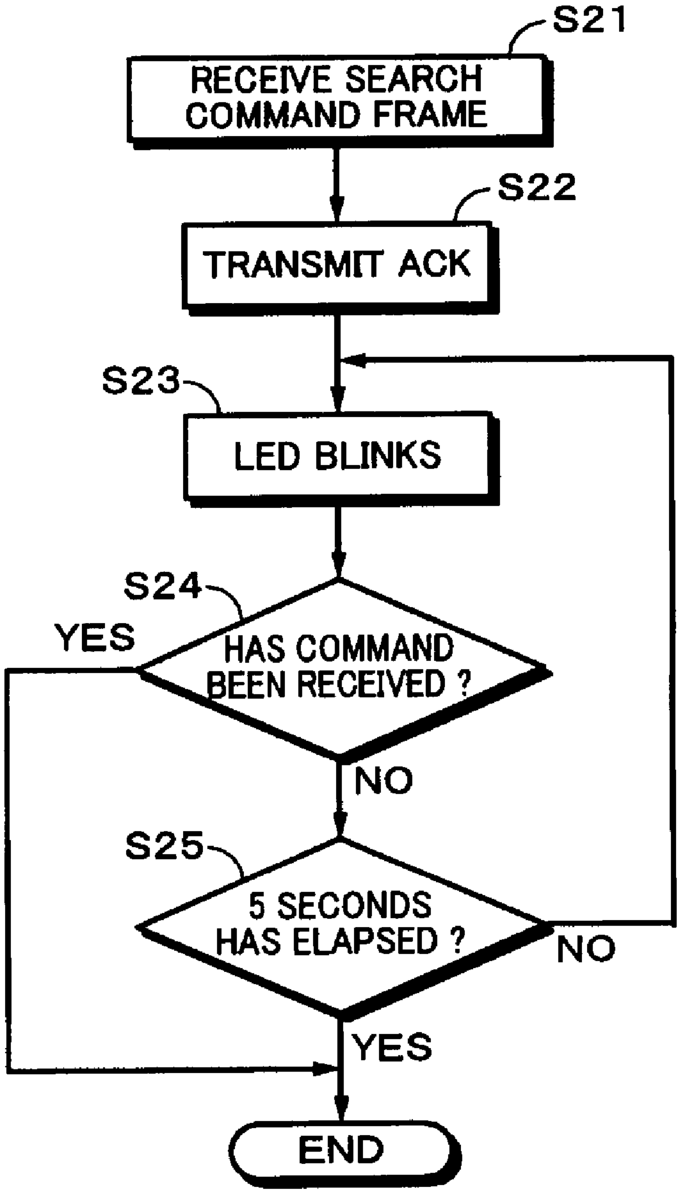
FIG. 7 is a flow chart showing a process of a device under remote control according to the embodiment of the present invention.

FIG. 7 shows a flow chart of a process of a device under remote control that has received a search command frame. At step S21, the device under remote control receives a self-addressed search command frame. At step S22, the device under remote control transmits acknowledge ACK to the remote controlling apparatus. At step S23, the device under remote control becomes a command acceptable state such that the user can know this state with an indication, sound, or the like. At step S23, an LED (Light Emitting Diode) disposed on a front panel of the device under remote control blinks.

The user can know that the device under remote control is in the command acceptable state with the LED that is blinking. When the user wants to transmit a command to this device under remote control, he or she performs an operation necessary for transmitting a command, for example, he or she presses a predetermined key. At step S24, the device under remote control determines whether or not it has received a command frame. When the device under remote control has received a command frame, the device under remote control completes the process. At step S25, the device under remote control determines whether or not 5 seconds has elapsed. In the device under remote control, the command frame reception state has been set for 5 seconds. In this period, the LED blinks.

Returning to FIG. 6, at step S15, the remote controlling apparatus transmits the search command frame. Thereafter, at step S16, the remote controlling apparatus determines whether or not a command transmission key has been pressed. When the determined result denotes that the key has been pressed, the flow advances to step S17. At step S17, the remote controlling apparatus transmits a command frame corresponding to the key that has been pressed. When the device under remote control has correctly received the command frame, the device under remote control sends acknowledge ACK back to the remote controlling apparatus. When the device under remote control has not correctly received the command frame, the remote controlling apparatus performs an error handling process (error informing process), retransmission process, or the like.

When the determined result at step S16 denotes that a key has not been pressed or when the device under remote control has received a command frame at step S17, the flow returns to step S14. At step S14, the remote controlling apparatus determines whether or not there is another device under remote control. When the determined result denotes that there is another device under remote control, the remote controlling apparatus repeats step S15 (transmitting a search command frame), step S16 (determining whether or not a key has been operated), and step S17 (transmitting a command frame). When the determined result at step S14 denotes that the remote controlling apparatus has completed these steps for all devices under remote control, the remote controlling apparatus completes the process.

The process shown in FIG. 7 is performed for one device under remote control. The same process is performed for other devices under remote control. Thus, when the remote controlling apparatus has detected a plurality of devices under remote control, the LEDs of the devices under remote control successively blink for a predetermined period of time (in this example, 5 seconds each). The user can identify devices under remote control that are in the command acceptable state with the LEDs that are blinking. As a result, the user can transmit his or her desired command to his or her desired device under remote control.

Figure 8:
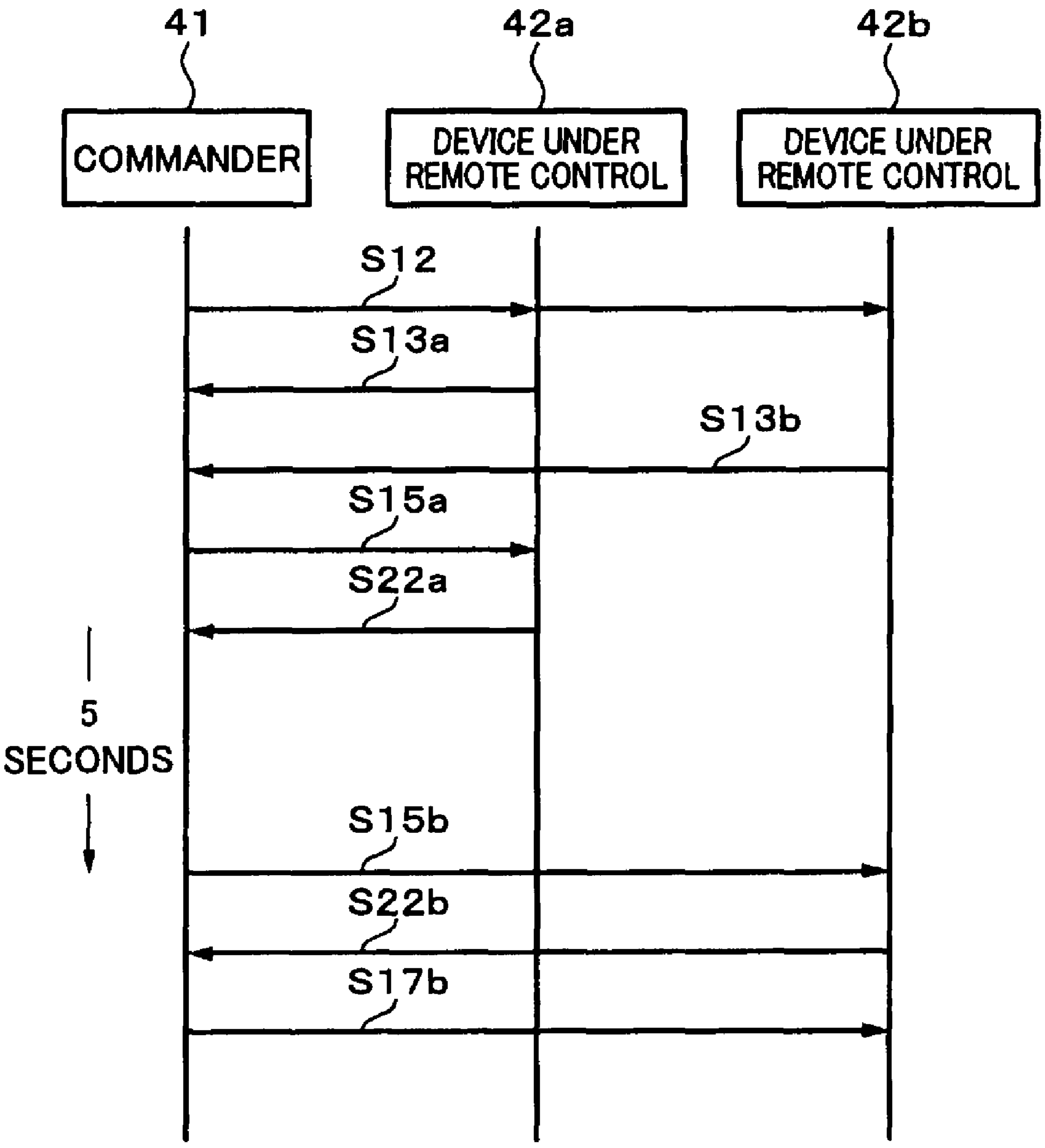
FIG. 8 is a schematic diagram describing a communicating process according to the other embodiment of the present invention.

Next, with reference to FIG. 8, a flow of a communication process made between a remote controlling apparatus (commander) and two devices under remote control that the remote controlling apparatus detects them will be described. The remote controlling apparatus (commander) (designated by reference numeral 41) broadcasts a confirmation frame to the devices under remote control (designated by reference numerals 42*a* and 42*b*) (at step S12). The devices under remote control 42*a* and 42*b* each transmit acknowledge ACK to the remote controlling apparatus (at steps S13*a* and S13*b*).

The remote controlling apparatus transmits the search command frame to the device under remote control 42*a* (at step S15*a*). When the device under remote control 42*a* has correctly received the search command frame, the device under remote control 42*a* transmits acknowledge ACK to the remote controlling apparatus 41 (at step S22*a*). The LED on the panel of the device under remote control 42*a* blinks for 5 seconds. In this period, the device under remote control 42*a* becomes the command frame acceptable state. FIG. 8 shows the case that the remote controlling apparatus 41 has not transmitted a command frame to the device under remote control 42*a*.

After 5 seconds has elapsed, the remote controlling apparatus 41 transmits the search command frame to the device under remote control 42*b* (at step S15*b*). When the device under remote control 42*b* has correctly received the search command frame, the device under remote control 42*b* transmits acknowledge ACK to the remote controlling apparatus 41 (at step S22*b*). Thereafter, the LED on the panel of the device under remote control 42*b* blinks for 5 seconds. In this period, the device under remote control 42*b* becomes the command frame acceptable state. The remote controlling apparatus 41 transmits the command frame to the device under remote control 42*b* (at step S17*b*). The device under remote control 42*b* that has correctly received the command frame transmits acknowledge ACK to the remote controlling apparatus 41 (this step is not shown). The device under remote control 42*b* performs an operation corresponding to the received command frame.

Figure 9:
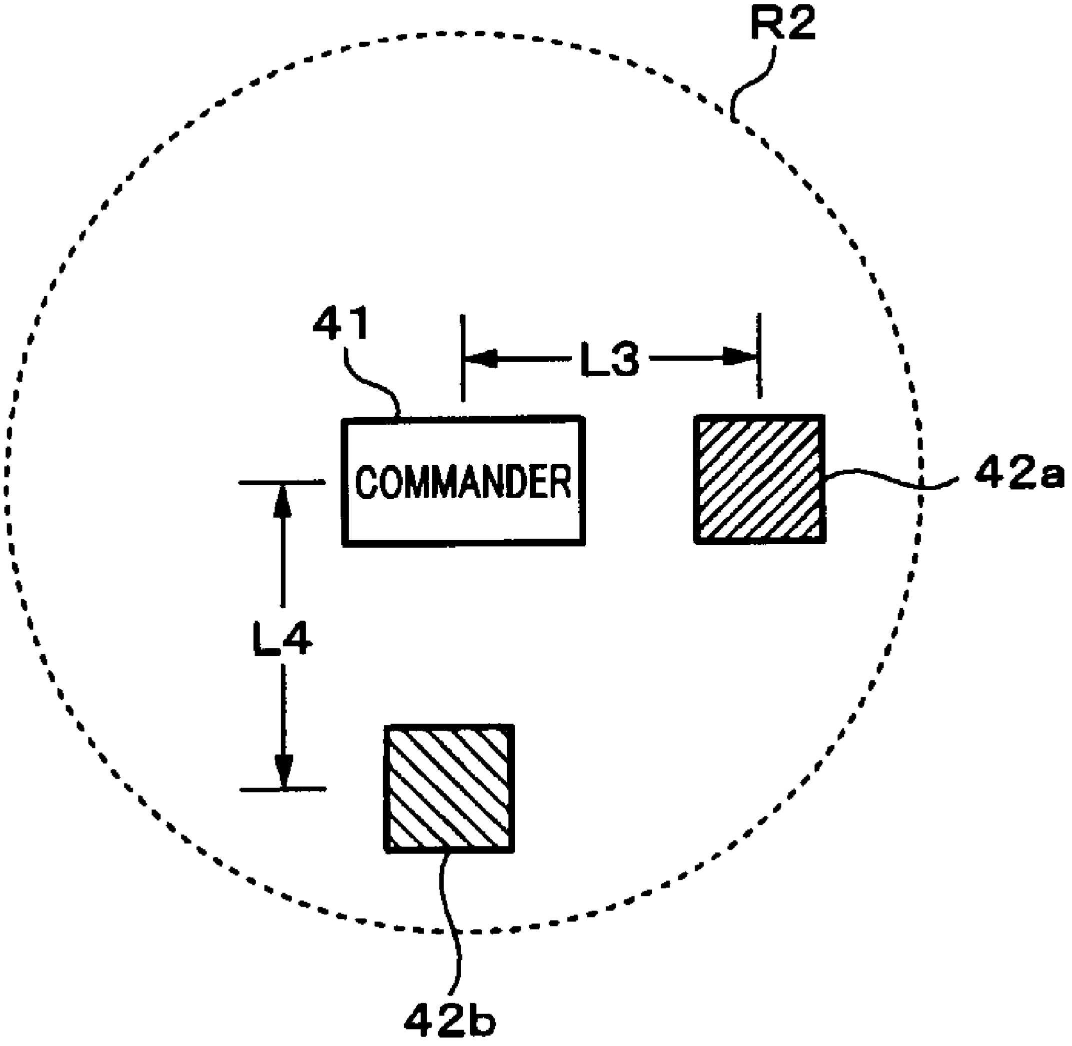
FIG. 9 is a schematic diagram describing the other embodiment of the present invention.

FIG. 9 shows the case that there are two devices under remote control 42*a* and 42*b* in the narrow communication range R2 corresponding to the decreased transmission output and distance L3 between the device under remote control 42*a* and the commander 41 and distance L4 between the device under remote control 42*b* and the commander 41 are nearly the same. In this embodiment, the user knows that the devices under remote control 42*a* and 42*b* are in the command frame acceptable state with their LEDs that are blinking. Thus, the user can remotely control desired one of the devices under remote control 42*a* and 42*b* with the remote controlling apparatus 41.

It should be understood by those skilled in the art that various modifications, combinations, sub-combinations and alternations may occur depending on design requirements and other factors insofar as they are within the scope of the appended claims or the equivalents thereof. For example, the wireless communication method may be other than IEEE 802.15.4.

What is claimed is:

1. A remote controlling apparatus for a remote controlling system of wireless communication type, comprising:
- means for broadcasting a predetermined signal in a lower transmission output state than in a regular communication state;
- means for receiving acknowledge and reception state electric field intensity information from at least one device under remote control;
- means for detecting a nearest device under remote control based on a highest reception state electric field intensity information received from the at least one device under remote control; and
- means for setting the nearest device as an object device under remote control.

2. The remote controlling apparatus as set forth in claim 1, further comprising:
- means for displaying the reception state electric field intensity information and identification information of the nearest device under remote control.

3. A remote controlling apparatus for a remote controlling system of wireless communication type, comprising:
- means for broadcasting a predetermined signal in a lower transmission output state than in a regular communication state;
- means for receiving acknowledge from at least one device under remote control;
- means for transmitting a predetermined command to each of the devices under remote control from which the remote controlling apparatus received an acknowledge, the predetermined command directing each of the devices under remote control to enter a command acceptable state for a predetermined period of time and provide a user-indication that each of the devices under remote control has entered the command acceptable state; and
- means for transmitting a command to a desired one of the devices under remote control for the predetermined period of time.

4. A remote controlling method for a remote controlling system of wireless communication type, comprising:
- broadcasting a predetermined signal in a lower transmission output state than in a regular communication state;
- receiving acknowledge and reception state electric field intensity information from at least one device under remote control;
- detecting a nearest device under remote control based on a highest reception state electric field intensity information received from the at least one device under remote control; and
- setting the nearest device as an object device under remote control.

5. A remote controlling method for a remote controlling system of wireless communication type, comprising:
- broadcasting a predetermined signal in a lower transmission output state than in a regular communication state;

receiving acknowledge from at least one device under remote control;

transmitting a predetermined command to each of the devices under remote control from which the remote controlling apparatus received an acknowledge, the predetermined command directing each of the devices under remote control to enter a command acceptable state for a predetermined period of time and provide a user-indication that each of the devices under remote control has entered the command acceptable state; and transmitting a command to a desired one of the devices under remote control for the predetermined period of time.

6. A remote controlling apparatus for a remote controlling system of wireless communication type, comprising:

a broadcasting section which broadcasts a predetermined signal in a lower transmission output state than in a regular communication state;

a receiving section which receives acknowledge and reception state electric field intensity information from at least one device under remote control;

a detecting section which detects a nearest device under remote control based on a highest reception state electric field intensity information received from the at least one device under remote control; and a setting section which sets the nearest device as an object device under remote control.

7. A remote controlling apparatus for a remote controlling system of wireless communication type, comprising:

a broadcasting section which broadcasts a predetermined signal in a lower transmission output state than in a regular communication state;

a receiving section which receives acknowledge from at least one device under remote control;

a first command transmitting section which transmits a predetermined command to each of the devices under remote control from which the remote controlling apparatus received an acknowledge, the predetermined command directing each of the devices under remote control to enter a command acceptable state for a predetermined period of time and provide a user-indication that each of the devices under remote control has entered the command acceptable state; and a second command transmitting section which transmits a command to a desired one of the devices under remote control for the predetermined period of time.

8. The remote controlling apparatus as set forth in claim 1, further comprising:

means for assigning a unique ID to a device under remote control from which an acknowledge is received which does not include a unique identifier; and means for storing the reception state electric field intensity information from the at least one device under remote control.

* * * * *